Sept. 7, 1948.  C. C. FUERST  2,448,877
BULB EXPOSURE MECHANISM FOR CAMERA SHUTTERS
Filed May 23, 1947  2 Sheets-Sheet 1

CARL C. FUERST
INVENTOR

BY
ATTORNEYS

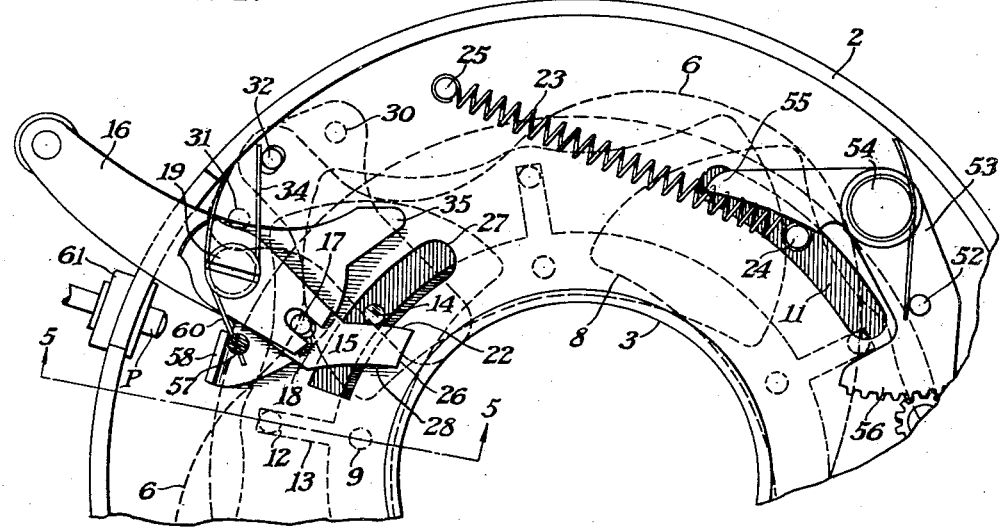

Patented Sept. 7, 1948

2,448,877

UNITED STATES PATENT OFFICE 2,448,877

BULB EXPOSURE MECHANISM FOR CAMERA SHUTTERS

Carl C. Fuerst, Rochester, N. Y., assignor to Eastman Kodak Company, Rochester, N. Y., a corporation of New Jersey Application May 23, 1947, Serial No. 750,009

6 Claims. (Cl. 95—60)

This invention relates to camera shutters and more particularly to the mechanism for producing prolonged exposures with such shutters, usually known as "bulb" exposures. One object of my invention is to provide a mechanism by which prolonged bulb exposures can be readily obtained with a shutter blade and cover-blind type of shutter. Another object of my invention is to provide a shutter having shutter blades which open and close during the tensioning movement, these blades operating in timed relation to cover blinds which remain closed until the shutter is tensioned, after which the cover blinds may be opened to permit an exposure to be made and to provide a suitable mechanism for operating the cover blinds and shutter blades in proper sequence for a "bulb" exposure. Other objects will appear from the following description, the novel features being particularly pointed out in the claims at the end thereof. In most shutters having a single set of shutter blades which only open and close when an exposure is to be made, it is customary to produce a "bulb" exposure by providing some form of stop which will hold the blades open as long as the shutter trigger is depressed, and permit the blades to close after the bulb exposure has been completed. However, when shutters are of the type in which the shutter blades both open and close in setting and in which cover blinds must be used to prevent exposure in setting, it is a somewhat more difficult problem to provide for prolonged exposures and to move the cover blinds out of their operative position so that the desired type of exposure can be made. This "bulb" exposure mechanism is particularly adapted for use in a shutter of the type fully described in my copending application Ser. No. 749,482, for Automatic high speed symmetrical blade and cover blind shutter, filed May 21, 1947.

Coming now to the drawings wherein like reference characters denote like parts throughout:

Fig. 4 is a view similar to Fig. 1, but with the shutter blades and cover blinds fully opened for "bulb" exposures;

Fig. 5 is an enlarged fragmentary sectional view taken on line 5—5 of Fig. 4; and Fig. 6 is a view of the cover blinds removed from the shutter casing and shown in their inoperative, or fully-opened position.

My preferred "bulb" type of exposure-making mechanism may be built into a shutter of the automatic type as shown herein, this shutter being of the type in which symmetrically-shaped shutter blades open and close as the blade-operating spring is tensioned, during which time cover blinds cover the exposure opening. This is accomplished by depressing a trigger and during the last part of the trigger movement and, after the shutter blades have closed, the cover blinds are opened and then the shutter is tripped, permitting the shutter blades to open and close, moving in a reverse direction to make an exposure.

Figure 1:
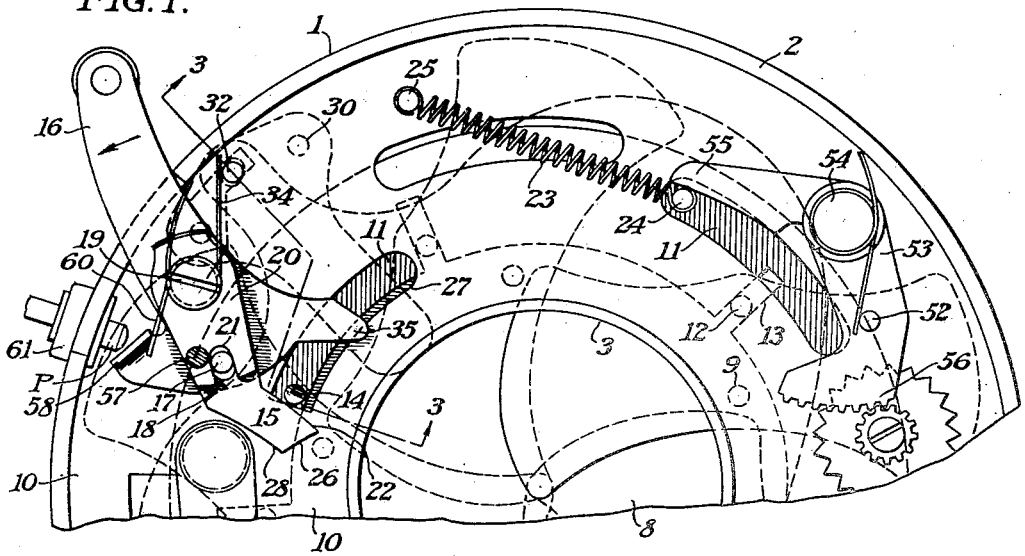
Fig. 1 is a top plan view of a portion of a shutter mechanism showing a "bulb" exposure device constructed in accordance with and illustrating a preferred embodiment of my invention. In this figure, the shutter cover plate and cam plate have been removed to expose the blade and cover-blind operating mechanism.
Figure 3:
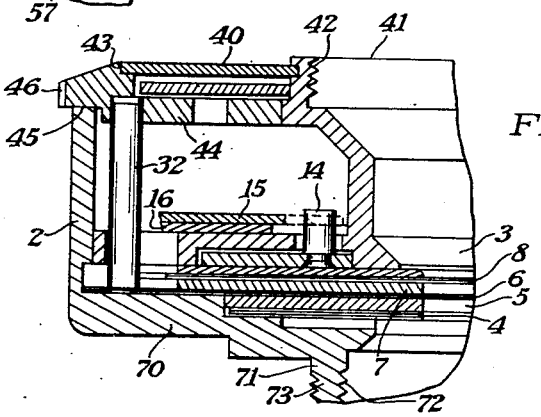
Fig. 3 is an enlarged fragmentary sectional view taken on line 3—3 of Fig. 1.

As indicated in the drawings, the shutter casing 1 may be of the usual type having an upstanding flange 2 around the periphery and including an exposure opening 3. This exposure opening, as indicated in Figs. 3 and 5 may contain at 4 a diaphragm of a known type for varying the aperture of the exposure opening. Such diaphragms are well known and do not form a part of the present invention. Over the top of the diaphragm blades 4, there is a ring 5 which spaces the cover blinds 6 from the diaphragm blades and over the top of the cover blinds 6 there is a ring 7 forming one of the mounts for the shutter blades 8. The shutter blades 8 may be mounted upon studs 9 carried by a mechanism plate 10, as best shown in Fig. 5. A blade ring 11 is provided with slots 13 for receiving studs 12 extending upwardly from the shutter blades. With reference to Fig. 1, when the blade ring 11 is moved in a clockwise direction, the blades will also move in such a direction about their pivotal points 9, first opening and then closing the exposure aperture 3.

This setting movement is obtained in the following manner. The blade ring 11 is provided with an upstanding beveled pin 14. This pin lies in the path of an arm 15 which is a separate part from the trigger 16 but which, nevertheless, turns with it because of a pin 17 carried by the trigger extending up through a slot 18 in the arm 15 which, like the trigger 16, is pivotally mounted upon a stud 19 carried by the mechanism plate 10. A spring 20 exerts an axial thrust downwardly upon the arm 15, this spring also being mounted to turn upon the stud 19 and having a slot 21 through which the pin 17 passes so that the spring will turn with the arm.

When the trigger 16 is moved in the direction shown by the arrow in Fig. 1, the cam edge 22 of arm 15 moves the pin 14 in a clockwise direction. This movement tensions a driving spring 23 attached to the blade ring 11 by means of a pin 24 and attached to the mechanism plate 10 by means of a spring 25. This movement of the blade ring 11 continues with the trigger movement until the end of the cam 22 is reached at which time a second cam 26 on the end of lever 15 takes over. The shape of this cam is such that the blade ring pin 14 may be held substantially stationary at the end of the setting movement with the spring 23 fully tensioned until slight further and final movement of the trigger causes the cam 26 to slip off the pin 14, permitting the spring to move the blade ring 11 in a counterclockwise direction, rocking the blades counterclockwise to open and close the exposure aperture. As the blade ring pin 14 moves through its slot 27 in the mechanism plate 10, it engages the arcuate cam 28 on the lever 15 and prevents the lever from turning and, consequently, the trigger from returning to its normal position of rest in Fig. 1.

It is, of course, necessary to momentarily hold open the cover blind 6 shown in Fig. 6 during the exposure-taking movement of the blades. This is accomplished as follows. The blinds 6 are pivoted upon studs 30 and 31 and one of these blinds has a pin 32 extending upwardly through a slot 33 in the other blind, so that both blinds are moved together in opposite directions and to equal extent as the pin 32 is moved. A spring 34 normally holds these blinds in an operative position by pressing on the pin 32, this spring encircling the trigger stud 19 and being shown under tension in Fig. 4.

For ordinary exposures, the pin 32 is engaged and moved by the trigger arm 35 being moved to its completely-open position just in advance of the slip-off between the cam 26 and the blade ring pin 14. This is accomplished for normal exposures, as fully described in my copending application and need not be additionally referred to here.

There is, however, a second means for operating the cover blind 6 and this is used for making "bulb" exposures.

Figure 2:
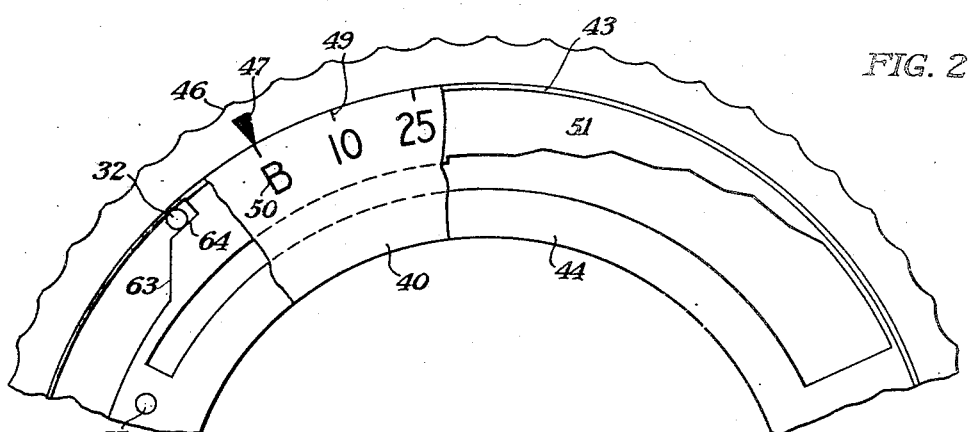
Fig. 2 is a fragmentary view of a portion of the shutter cover plate and the exposure-setting cam portions of the cover plate being broken away to expose the cam ring.

In Fig. 2, a portion of the shutter cover plate 40 is shown, this cover plate being held by the front shutter extension 41 which is threaded at 42 to receive a front lens cell. It also rests in a rabbet 43 in the cam plate 44 which is mounted to turn on the periphery 45 of the flange 2 and which is preferably provided with a roughened or knurled edge 46 for turning the cam plate between the cover 40 which remains stationary and the shutter flange 2. As best shown in Fig. 2, there is a pointer 47 on the adjusting ring and the cover plate 40 bears a series of graduations 49 indicating automatic shutter speeds and an indication 50, here shown as "B," to indicate when the shutter mechanism is set for "bulb" exposures. The cam 51 may adjust an upstanding pin 52 of a bell-crank lever 53 pivoted at 54 to the shutter mechanism plate and having an arm 55 which may be moved more or less into the path of blade ring pin 24 to retard its movement through the gear train shown broadly as 56. This construction is shown in my copending application.

The cam ring 44 is also responsible for "bulb" exposures and, to that end, it is provided with a downwardly-extending pin 57, which, as best shown in Fig. 5, is moved by the cam ring to a position to block complete movement of the trigger 16 by lying in the path of an upstanding lug 58 on the trigger. When so positioned, the trigger 16 can only move approximately half of its normal movement, as shown in Fig. 4. This movement is, however, sufficient to move the pin 14 and with it the blade ring 11 and the shutter blades 8 to a fully-opened position. This position is shown in Fig. 4. As soon as pressure on the trigger 16 is released, it will return under the impulse of its spring 60 to its normal rest position shown in Fig. 1. It is noted that the flange 58 of the trigger lies in the path of a cable release plunger "P" which may operate the shutter in lieu of the shutter trigger 16 by passing through a ferrule 61 in the shutter flange 2.

The cam 44 accomplishes the additional function of moving the cover blinds 6 to their inoperative position of Fig. 6 and out of the path of the trigger. This is accomplished by the cam slot 63 shown in Fig. 2, the slot ending in a narrow notch 64, so positioned that when set on "B" the cover-blind operating pin 32 will ride up and be confined in the narrow slot 64, thereby moving the cover blind to the Fig. 6 position. When the knurled ring 46 is moved clockwise from the Fig. 2 position, the pin 32 may return the cover blinds 6 to their operative position by moving down the ramp 63 of the cam slot, thus positioning the cover blinds for their normal function for instantaneous exposures described above.

The rear wall 70 of the shutter casing is provided with a threaded tubular extension 71, the inner thread 72 being normally used to receive a rear lens element and the outer thread 73 being normally used to hold the shutter on a lens board as by the use of a threaded collar.

It will be seen from the above description that when bulb exposures are made, the shutter trigger only has one set of blades to move, that is, the shutter blades, and these are only moved to half their usual extent, opening the exposure aperture 3. Since the spring 23 is placed under tension during this movement, the release of this trigger causes this spring to immediately return the blades to their operative aperture-covering position shown in Fig. 1. The cover blinds are, of course, moved to their inoperative position in setting the knurled member 46 to its Fig. 2 position, since, by turning the cam ring, the pin 32 is slid against the pressure of spring 34 to its outermost position as it moves up the ramp 63 into the notch 64 defining the inoperative position of the shutter leaves. For instantaneous exposures, the trigger moves both the shutter leaves and the cover blinds in timed relation for bulb exposures; for "bulb" exposures the trigger moves only the shutter blades to an open position and then permits them to move to a closed position under the impulse of the blade ring spring 23. This construction provides a simple means for producing exposures of any desired duration, which "bulb" exposures are made by opening the shutter blades through depressing the trigger through approximately half of its usual stroke and then by releasing the trigger, permitting the blades to close.

I claim:

1. In a camera shutter of the type including an apertured casing, a plurality of shutter blades mounted in the casing, cover blind pivotally mounted in the casing, the combination with said shutter blades and cover blind, of mechanism for operating the shutter blades and cover blind in timed relation for normal exposures, said mechanism including a trigger, a setting device for setting the shutter for different exposures including "bulb" and means carried by the setting device for moving the cover blind from an operative to an inoperative position for making "bulb" exposures whereby actuation of the trigger may make a "bulb" exposure with the shutter leaves alone.

2. In a camera shutter of the type including an apertured casing, a plurality of shutter blades for making an exposure and cover blinds for normally covering the exposure aperture, the combination with said shutter blades and cover blinds, of mechanism for normally operating the shutter blades in timed relation to the cover blinds for automatic exposures, a setting dial to determine the character of exposures including "bulb" exposures and means operable thereby for moving the cover blinds open and limiting the mechanism movement for operating the shutter blades to an extent to hold the shutter blades open when said setting dial is moved to a "bulb" position, and a trigger, forming a part of the mechanism for manually operating the mechanism for releasing the shutter blades for making an exposure when said dial is set for "bulb" exposures.

3. In a camera shutter of the type including an apertured casing, a plurality of symmetrically-shaped, pivotally-mounted blades in the casing adapted to move to open and close the aperture, the combination with said blades, of a blade ring operably connected with the blades for moving the blades, a pin on the blade ring, a spring normally moving the blade ring in one direction, a trigger for setting and releasing the blade ring spring, a pair of cover blinds pivotally mounted in the casing and movable to open and close the shutter aperture, means for opening and closing the cover blinds by the trigger in timed relation to the shutter blades and an exposure dial on the shutter movable to indicate different types of exposures including "bulb," said dial when moved to "bulb" setting including means for opening the cover blinds independently of the trigger, said dial also including means movable into the path of the trigger when set for "bulb" for limiting the trigger movement whereby pressure on the trigger may open the shutter blades and release of the trigger may cause the shutter blades to close under the influence of the blade ring spring.

4. A bulb exposure shutter mechanism for camera shutters including an apertured shutter casing, cover blinds pivotally mounted in the casing and normally held in an operative position covering the aperture by a spring, shutter blades pivotally mounted in the casing, mechanism in the shutter for moving the blades in one full stroke in one direction to open and close the apertured casing to make an exposure, said mechanism including a trigger and means on the trigger for also moving the cover blinds, a movably-mounted bulb exposure control carried by the shutter and means carried thereby for actuating the cover blinds to an inoperative position in which they do not cover the aperture in the casing by moving the bulb control to a bulb-indicating position, said bulb control also positioning a stop to limit the movement of the mechanism for moving the shutter blades to one-half of its full stroke to stop the blades and trigger movement when the blades are fully open, said mechanism for moving the blades closing the blades upon release of the trigger.

5. The bulb exposure shutter mechanism for camera shutters, defined in claim 4, characterized in that the stop interposed by said bulb exposure control being interposed directly in the path of the trigger for limiting the movement thereof.

6. The bulb exposure shutter mechanism for camera shutters defined in claim 4, characterized by the bulb control including a cam for engaging and moving a pin for operating the cover blinds in moving toward a bulb exposure indicating position, said spring for holding the cover blinds in an operative position covering the aperture returning said blinds to their operative position when the bulb control is moved away from its bulb indicating position.

CARL C. FUERST.